United States Patent
Smith et al.

(10) Patent No.: US 6,472,843 B2
(45) Date of Patent: Oct. 29, 2002

(54) SYSTEM SPECIFIC FLUID FLOW CONTROL WITH INDUCTION MOTOR DRIVE

(75) Inventors: Michael D. Smith, Jefferson City, MO (US); Thien Q. Tran, Jefferson City, MO (US); Christopher Douglas Schock, Springfield, MO (US); James R. Peterson, Fond duLac, WI (US); Parimalalagan Ramachandran, Ozark, MO (US)

(73) Assignee: Fasco Industries, Inc., Cassville, MO (US)

( * ) Notice: Subject to any disclaimer, the term of this patent is extended or adjusted under 35 U.S.C. 154(b) by 0 days.

(21) Appl. No.: 09/764,667

(22) Filed: Jan. 18, 2001

(65) Prior Publication Data

US 2001/0033147 A1 Oct. 25, 2001

Related U.S. Application Data

(60) Provisional application No. 60/177,130, filed on Jan. 20, 2000.

(51) Int. Cl.$^7$ ................................................. H02P 1/24
(52) U.S. Cl. ..................... 318/727; 318/798; 318/802; 318/807; 318/811; 318/812; 318/810; 318/432
(58) Field of Search .................... 318/727, 798, 318/802, 807, 811, 812, 810, 432

(56) References Cited

U.S. PATENT DOCUMENTS 4,767,279 A * 8/1988 Dourdeville et al. .......... 417/18
6,097,171 A * 8/2000 Branecky .................... 318/808

* cited by examiner

Primary Examiner—Karen Masih
(74) Attorney, Agent, or Firm—Andrus, Sceales, Starke & Sawall, LLP

(57) ABSTRACT

An apparatus and method for controlling a motor/blower system to provide a constant fluid flow by iteratively loading revised stator frequency values and stator voltage values to a variable frequency drive. Target DC bus current values corresponding to constant fluid flow rates are predetermined and stored as a function of the desired fluid flow rate, the operating frequency, and system specific constants or calculated by the controller as a function thereof during system operation. Actual DC bus current is measured with a current sensor and compared with the target DC bus current. Operating frequency is estimated using a PI controller based on the difference between measured and target DC bus current values. Operating voltage values corresponding to operating frequencies and system specific constants are predetermined and stored in memory or calculated by the controller during system operation. An updated target DC bus current, operating frequency and operating voltage are determined upon each iteration. The updated operating frequency and operating voltage are loaded as control variables to the variable frequency drive upon each iteration.

10 Claims, 2 Drawing Sheets

SYSTEM SPECIFIC FLUID FLOW CONTROL WITH INDUCTION MOTOR DRIVE

CROSS REFERENCE TO RELATED APPLICATIONS

The present application is based on and claims priority to U.S. Provisional Patent Application No. 60/177,130, filed on Jan. 20, 2000, the disclosure of which is incorporated herein by reference.

STATEMENT REGARDING FEDERALLY SPONSORED RESEARCH OR DEVELOPMENT

Not applicable

BACKGROUND OF THE INVENTION

The invention relates to a motor controller and more particularly to a motor controller for driving a fluid impeller and still more particularly to a motor controller for driving a fluid impeller to provide a specific fluid flow rate.

It is known to employ electric motors to drive fluid impellers such as fan blades or blower cages in air moving apparatus. Such apparatus are typically used in heating, ventilation and air conditioning applications.

It is further known that heating, ventilation and air conditioning systems require a constant fluid flow in order to operate efficiently. Fluid resistance in the ducting of such systems typically varies with time as a result of variations in fluid paths and duct openings. For example, every adjustment of a ventilation opening causes a fluid resistance change in the ducting.

It is known that blower torque must be adjusted to compensate for variable fluid resistance if constant fluid flow is to be maintained.

Various methods and apparatus are known to adjust blower torque in response to variations in fluid resistance or load. Typically, fluid flow may be measured directly by fluid flow transducers which are immersed in the fluid flow path. An electrical signal is typically fed back from the transducers to a microprocessor system or an electric circuit which is designed to adjust the speed of a blower motor to approach a predetermined constant value. Such systems are often too expensive or comprise components that are too large for use in practical heating, ventilation and air conditioning applications.

It is known that the magnitude of phase current in a blower motor drive circuit is related to the magnitude of fluid flow which is impelled by the blower. It is further known to provide a constant flow by comparing a measured phase current of a blower motor drive circuit with an empirically determined ideal reference phase current to determine an error phase current signal. The empirically determined reference phase current value is typically stored in a look-up table in the memory of a microprocessor system. It is further known to manipulate an error phase current signal so that it is suitable for an input as an index to a pulse width modulator in a motor control circuit wherein the motor control circuit is caused to change the motor speed to reduce the error phase current signal. The error phase current signal is reduced as the measured motor current approaches the ideal constant flow reference phase current.

Such methods may provide imprecise control because motor phase currents are known to fluctuate and are typically noisy. Furthermore, such methods require added cost because they typically require motor speed measuring components.

It is desirable to provide a constant fluid flow motor controller of reduced complexity by means that do not require direct measurement of a fluid flow rate, that do not rely on motor phase current measurements and do not require direct motor speed measurements or speed measuring components.

SUMMARY OF THE INVENTION

Accordingly, the invention provides a specific fluid flow motor control by operating on critical motor parameters internal to a variable frequency drive. The invention relates to an iterative method of controlling an induction motor to cause a blower to provide a constant selected fluid flow. In at least one embodiment the controller of the invention initially causes a motor to ramp up to an initial operating point. The controller allows the motor/blower system to stabilize at the initial operating point in response to ambient pressure. The controller of the invention then determines a target DC bus current, $I_{dc}$, that corresponds to a constant selected flow rate at the operating frequency and by employing relation 1.

$$I_{dc}=f_i(F_s, K_m, A_i, B_i, C_i, D_i \ldots ) \qquad \text{Relation 1:}$$

Relation 1 states that the target DC bus current magnitude which will cause a motor blower to produce a constant selected fluid flow rate is a function of stator voltage operating frequency, $F_s$, a set of one to any number of system specific constants, $A_i, B_i, C_i, D_i \ldots$, and a selected fluid flow rate which is represented by parameter $K_m$. In one embodiment of the present invention, the controller of the invention employs a microprocessor system having an electronic memory wherein a table of values of $I_{dc}$ are indexed by required fluid flow rate values and operating frequency. This table is precalculated using the motor/blower system specific constants $A_i, B_i, C_i$ and $D_i \ldots$ which are empirically determined for the specific motor/blower system. This alternative embodiment comprises a microprocessor system having a memory wherein only the parameters $A_i, B_i, C_i, D_i \ldots$ are stored. The alternative embodiment further comprises an electronic means such as a digital signal processor which computes values of $I_{dc}$ based on the stored parameters and an empirically determined function (relation 1).

After determining the target DC bus current, $I_{dc}$, the controller of the invention measures the actual DC bus current, $I_a$, and determines an error current value which is equal to the difference between the target DC bus current, $I_{dc}$, and the measured DC bus current, $I_a$.

The controller of the invention then employs a PI (Proportional Plus Integrating) controller to estimate a new operating stator frequency which will cause the DC bus current to approach the required magnitude. The PI controller is an essential element of the invention.

The controller of the invention then employs relation 2 to determine an operating stator voltage root mean square value, $V_s$, as a function of the new operating frequency $F_s$, and a set of one to any number of empirically determined system specific constants, $A_v, B_v, C_v, D_v \ldots$.

$$V_s=f_v(F_s, A_v, B_v, C_v, D_v \ldots ) \qquad \text{Relation 2:}$$

Relation 2 states that the appropriate stator voltage, $V_s$, is a function of the operating frequency and any number of system specific constant values, $A_v, B_v, C_v, D_v \ldots$. The controller of the invention employs a microprocessor system having an electronic memory wherein a table of values of $V_s$ are indexed by the operating frequency only. This table is precalculated using the motor/blower system specific constants $A_v$, $B_v$, $C_v$, $D_v$ . . . , which are empirically determined for the specific motor/blower system. An alternative embodiment comprises a microprocessor system having a memory wherein only the parameters $A_v$, $B_v$, $C_v$, $D_v$ . . . are stored. This alternative embodiment further comprises an electronic means such as a digital signal processor which computes values of $V_s$ based on the stored parameters and an empirically determined function (relation 2).

The new operating stator frequency and stator voltage root mean square are provided to the variable frequency drive. The controller of the invention then allows a stabilization time delay to pass before beginning another iteration of the method.

After each stabilization period, the controller of the invention begins another iteration by determining a target DC bus current using relation 1. Then the controller of the invention completes the iteration by measuring the actual DC bus current, calculating the current error, estimating a new stator operating frequency, determining the appropriate voltage at the new stator frequency and loading the new stator operating voltage and frequency values into the pulse width modulator.

DETAILED DESCRIPTION OF THE INVENTION

Figure 2:
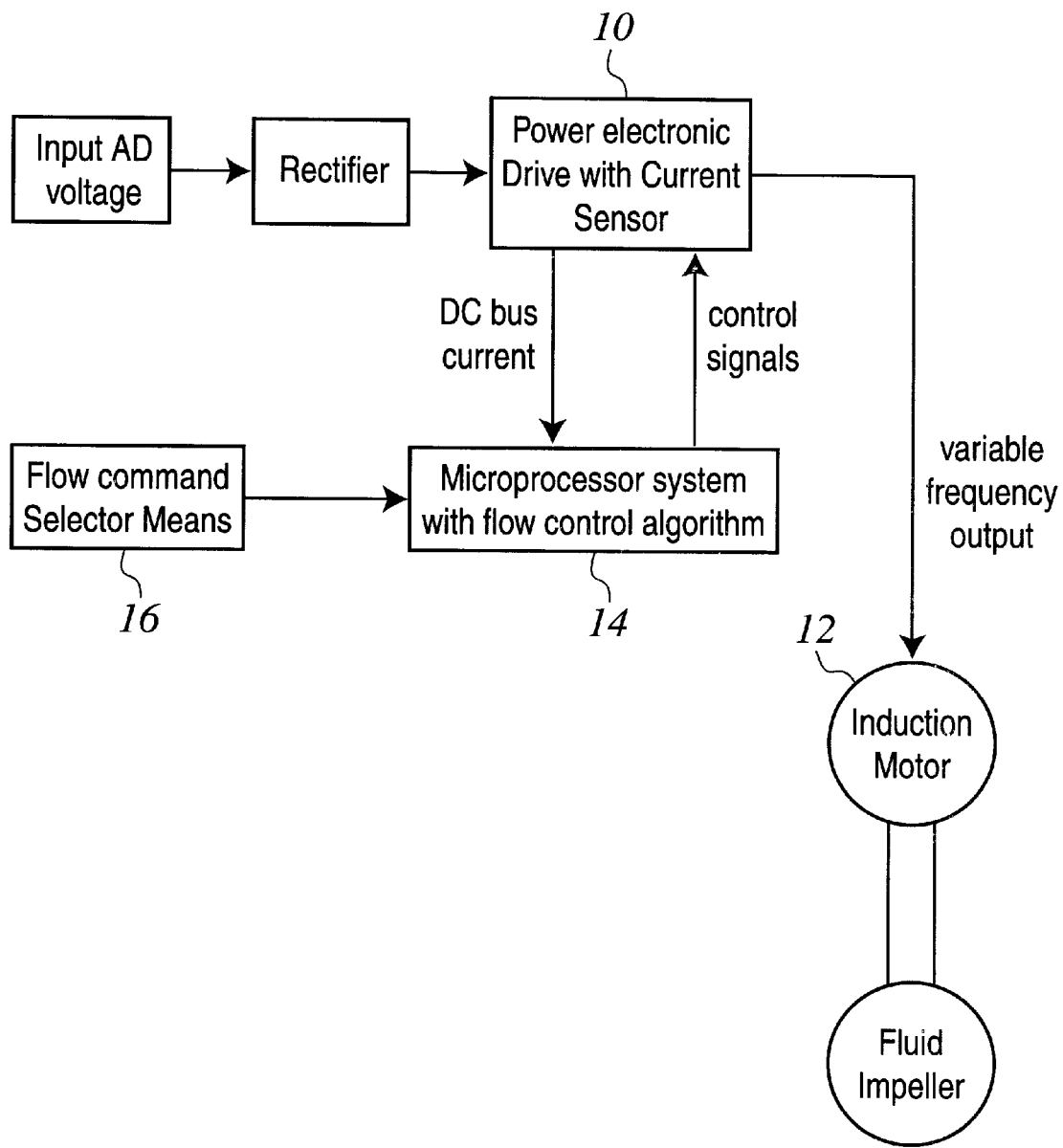
FIG. 2 is a block diagram illustrating the motor control circuit operated in accordance with the method of the present invention.

Referring first to FIG. 2, the specific flow motor controller of the invention comprises means for detecting a direct current bus current 10 in an induction motor 12 in communication with means for signal manipulation, preferably a microprocessor system 14 or digital signal processor, means for producing an electrical signal, such as a switch bank or analog input device to represent a specific fluid flow rate in communication with the manipulation means, and memory means to store electrical signals which represent a plurality of numeric constant values. The manipulation means are in electrical communication with a variable frequency drive and are capable of modifying a voltage/frequency index to the variable frequency drive.

The manipulation means execute program steps which change the voltage/frequency index of the variable frequency drive to cause a motor/blower rotational speed to ramp up from zero rotations per minute to a predetermined steady state speed within a predetermined start-up time. The steady state speed and start-up time are determined according to the rotational inertia of the particular motor—blower system and the required speed range.

Figure 1:
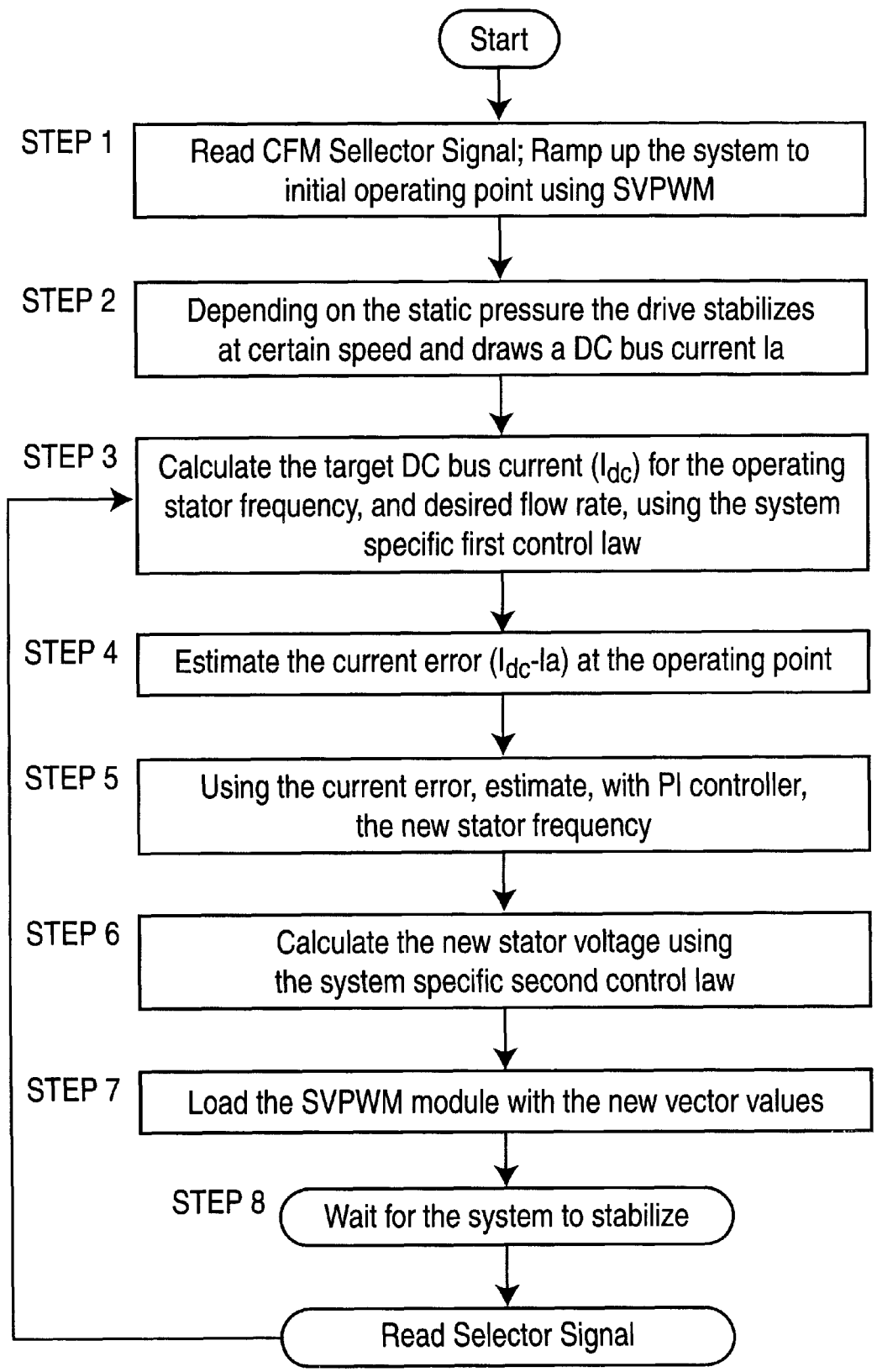
FIG. 1 is a flow chart of at least one embodiment of the method of the invention.

Referring to FIG. 1 at STEP 1, a selected flow rate is determined manipulating the electrical signal from the selector means 16 (FIG. 2) and is represented in memory by a numerical value $K_m$. The manipulation means reads a system specific initial stator frequency value $F_s$, and stator voltage value, $V_s$, corresponding to the selected flow rate from a predetermined list of values stored in memory. The initial stator frequency and stator voltage values are applied to a variable frequency drive which causes the blower/motor to ramp up to an initial operating point.

Referring to FIG. 1 at STEP 2, the manipulation means waits for a predetermined system specific settle time to elapse which allows the system to stabilize at a certain speed depending on an ambient fluid pressure. The stabilized system draws a specific DC bus current.

Referring to FIG. 1 at STEP 3, the manipulation means then determines a target DC bus current, $I_{dc}$, corresponding to the stator frequency, $F_s$, and a set of system specific constants. In the preferred embodiment the manipulation means determines the target DC bus current, $I_{dc}$, according to relation 1 and refers to a set of one to any number of system specific constants: $A_i$, $B_i$, $C_i$, $D_i$ . . . .

The DC link current in the inverter-fed drive application represents the power level of the motor driving the blower. By properly selecting and controlling the DC link current, the flow control can be achieved. However, the estimation of this current level involves the highly nonlinear relationship among the variables such as the operating speed, flow level and static pressure in the system. This DC link current selection can be made based on experimentation and the characteristics can be expressed in the form of relation (1). This step involves collecting the experimental data for the motor/blower combination for the required range of operating speeds, flow levels and static pressure values.

The system dynamics involved in the control of flow using an inverter fed induction motor are quite complex. In the preferred embodiment, optimum system performance is achieved by applying one of two or more subsets, preferably one of two subsets, of system specific constants to relation 1 wherein each subset is predetermined to optimize system performance for a specific range of stator frequency values.

Referring to FIG. 1 at STEP 4, the manipulation means then reads the actual DC bus current, $I_a$, from a current sensor in the DC bus and calculates a current error which is the difference between the target DC bus current, $I_{dc}$, and the actual DC bus current, $I_a$.

Referring to FIG. 1 at STEP 5, the manipulation means calculates a revised stator frequency to minimize the current error. The invention employs a PI controller to provide the revised stator frequency signal. The PI controller is a well known control system technique and an essential element of the invention.

Referring to FIG. 1. at STEP 6, the manipulation means then determines a revised stator voltage, $V_s$, corresponding to the revised stator frequency, $F_s$, and a set of system specific constants. In the preferred embodiment the manipulation means determines the revised stator voltage according to relation 2 and refers to a set of one to any number of system specific constants $A_v$, $B_v$, $C_v$, $D_v$ . . . . In the preferred embodiment, optimum system performance is achieved by applying one of two or more subsets, preferably one of two subsets, of system specific constants to relation 2 wherein each subset is predetermined to optimize system performance for a specific range of stator frequencies.

Generally a variable speed induction motor is operated with a constant volts per Hertz ratio. This implies that the flux level in the motor is held nearly constant at all operating frequencies. However, in a blower drive application the torque requirement varies almost as a square of the speed and as such the blower torque requirement during low speed operations is small. In view of this, the variable speed induction motor driving the blower can be operated at a reduced flux level at lower speeds to minimize the magnetization losses. Hence, a multitude of voltage to frequency relationships can be employed for the induction motor in a blower application. The voltage relationship in relation (2) is chosen based on the above considerations.

Referring to FIG. 1. at STEP 7, the manipulation means then applies the revised stator voltage and revised stator frequency to the variable frequency drive.

Referring to FIG. 1. at step 8, during the final stage of each iteration of the method of the invention, the manipulation means waits for a predetermined settle time to elapse during which the system is allowed to stabilize. The manipulation means then reads the electrical signal for the selector means and begins the next iteration at step 3.

We claim:

1. An apparatus for providing a constant fluid flow comprising:

a induction motor having at least one rotor, and at least one variable frequency drive;

at least one fluid impeller attached to said at least one rotor wherein said at least one fluid impeller is constrained to rotate with an angular velocity equal to an angular velocity of said at least one rotor;

electronic components capable of storing and manipulating electrical signals wherein said electronic components are in electrical communication with said at least one variable frequency drive;

selector means in electrical communication with said electronic components wherein said selector means are configured to provide electrical signals which represent a desired fluid flow rate;

a zeroth data set stored as electrical signals in said electronic components comprising estimated initial values of stator frequency and stator voltage as a function of said desired fluid flow rate;

at least one set of system current constant values stored as electrical signals in said electronic components;

at least one set of system voltage constant values stored as electrical signals in said electronic components;

a first data set stored as electrical signals in said electronic components comprising target DC bus current values as a function of said desired fluid flow rate, a stator frequency and said at least one set of system current constants;

a second data set stored as electrical signals in said electronic components comprising root mean square voltage values for a stator voltage as a function of said stator frequency and said at least one set of system voltage constants;

a current sensor disposed in functional proximity to a DC bus of said variable frequency drive and in electrical communication with said electronic components wherein said current sensor provides electrical signals to said electronic components which represent a measured DC bus current value;

electrical signals comprising a program stored in said electronic components wherein said program causes said electronic components to:

read said desired fluid flow rate;

read an estimated stator frequency value and an estimated stator voltage value from said zeroth data set as a function of said desired fluid flow rate;

write said estimated stator frequency value and said estimated stator voltage values as inputs to said at least one variable frequency drive;

allow a system specific settle time to elapse during which said motor and fluid impeller reach a steady state in response to said inputs and an ambient fluid pressure;

read a target DC bus current value from said first data set as a function of said stator frequency value, said desired flow rate value, and a set of said at least one set of system current constants;

read a measured DC bus current value from said current sensor;

compare said target DC bus current value with said measured DC bus current value and determine a DC bus current error value wherein said DC bus current error value is a difference between said target DC bus current value and said measured DC bus current value;

calculate an updated stator frequency value as a function of said DC bus current error value using a PI controller;

read a root mean square stator voltage value from said second data set as a function of said updated stator frequency value and a set of said at least one set of system voltage constants;

write said updated stator frequency value and said root mean square stator voltage value as updated inputs to said variable frequency drive;

allow a system specific settle time to elapse during which said motor and fluid impeller reach an updated steady state in response to said updated inputs and ambient fluid pressure;

read an updated desired fluid flow rate from said selector means;

perform a next iteration of said program beginning at reading a target DC bus current from said first data set.

2. The apparatus according to claim 1 wherein said electronic components comprise a microprocessor system.

3. The apparatus according to claim 1:

wherein said at least one set of system current constant values comprises a first set of system current constant values and a second set of system current constant values;

wherein said target DC bus current values in said first data set are accessed as a function of said desired flow rate, a stator frequency and said first set of system current constant values if said stator frequency is less than or equal to a system current frequency limit and as a function of said desired flow rate, a stator frequency, and said second set of system current constant values if said stator frequency is greater than said system current frequency limit;

wherein said at least one set of system voltage constant values comprises a first set of system voltage constant values and a second set of system voltage constant values;

wherein said root mean square value for said stator voltage in said second data set are accessed as a function of said stator frequency and said first set of system voltage constant values if said stator frequency is less than or equal to a system voltage frequency limit and as a function of said stator frequency, and said second set of system voltage constant values if said stator frequency is greater than said system voltage frequency limit.

4. The apparatus according to claim 3 wherein said electronic components comprise a microprocessor system.

5. The apparatus according to claim 1:

wherein said at least one set of system current constant values comprises any number of consecutive sets of system current constant values and wherein each set corresponds to a specific operating frequency range;

wherein said target DC bus current values in each data set are accessed as a function of said desired flow rate, a stator frequency and said set of system current constant values which corresponds to a particular operating frequency range;

wherein said at least one set of system voltage constant values comprises any number of consecutive sets of system voltage constant values;

wherein said root mean square value for said stator voltage in each data set are accessed as a function of said stator frequency and a set of system voltage constant values which corresponds to a particular frequency range.

6. The apparatus according to claim 5 wherein said electronic components comprise a microprocessor system.

7. A method for providing a constant fluid flow comprising:

providing an induction motor having at least one rotor and at least one variable frequency drive wherein at least one fluid impeller is rigidly and coaxially attached to said at least one rotor and; electronic components capable of storing and manipulating electrical signals wherein said electronic components are in electrical communication with said at least one variable frequency drive and; selector means in electrical communication with said electronic components wherein said selector means are capable of being configured to provide electrical signals which represent a desired fluid flow rate;

storing electrical signals representing a zeroth data set in said electronic components wherein said zeroth data set comprises estimated initial values of stator frequencies and stator voltages as a function of said desired fluid flow rate;

storing electrical signals representing at least one set of system current constant values in said electronic components;

storing electrical signals representing at least one set of system voltage constant values in said electronic components;

storing electrical signals representing a first data set in said electronic components wherein said first data set comprises target DC bus current values as a function of said desired fluid flow rate, a stator frequency and said at least one set of system current constant values;

storing electrical signals representing a second data set in said electronic components wherein said second data set comprises root means square voltage values for a stator voltage as a function of said stator frequency and said at least one set of system voltage constant values;

providing a current sensor disposed in functional proximity to a DC bus of said variable frequency drive and in electrical communication with said electronic components wherein said current sensor is capable of providing electrical signals to said electronic components which represent a measured DC bus current value;

configuring said selector means to provide an electrical signal which represents a desired fluid flow rate;

loading said electrical signals representing a desired fluid flow rate value to memory space in said electronic components;

loading electrical signals representing an estimated stator frequency value and an estimated stator voltage value as a function of said desired flow rate into memory space in said electronic components;

loading said electrical signals representing an estimated stator frequency value and an estimated stator voltage value to said at least one variable frequency drive;

allowing a system specific initial settle time to elapse wherein said settle time is of sufficient duration to allow said motor and fluid impeller to reach a steady state;

loading electrical signals representing a target DC bus current value from said first data set as a function of said stator frequency value, said desired flow rate value and at least one set of system current constant values to program memory space in said electronic components;

loading electrical signals representing a measured DC bus current value from said current sensor to memory space in said electronic components;

comparing said electrical signals representing said target DC bus current value in said memory space to said electrical signals representing a measured DC bus current value in said memory space and loading an electrical signal representing a DC bus current error value which equals the difference between said target DC bus current value and said measured DC bus current value to memory space in said electronic components;

calculating an updated stator frequency value as a function of said DC bus current error value;

loading a root mean square voltage value from said second data set as a function of said updated frequency value and a set of said at least one set of system voltage constant values to said memory space of said electronic components;

loading said updated stator frequency value and said root mean square stator voltage value to said at least one variable frequency drive;

allowing a system specific settle time to elapse wherein said settle time is of sufficient duration to allow said motor and fluid impeller to reach an updated steady state;

loading electrical signals representing a desired fluid flow rate from said switches to memory space in said electronic components;

performing a next iteration of said method beginning at reading a target DC bus current value from said first data set.

8. The method according to claim 7 wherein said electronic components comprise a microprocessor system.

9. The method according to claim 7:

wherein said at least one set of system current constant values comprises any number of sets of system current constant values;

wherein said at least one set of system voltage constant values comprises any number of sets of system voltage constant values;

further comprising:

storing electrical signals representing a system current frequency threshold and electrical signals representing a system voltage frequency threshold;

loading said target DC bus current value as a function of said desired fluid flow rate, a stator frequency and an appropriate set of system current constant values corresponding to the operating frequency range;

loading said root mean square value for said stator voltage as a function of said stator frequency and said first set of system voltage constant values if said stator frequency is less than or equal to said system voltage frequency threshold and; as a function of said stator frequency and said second set of system voltage constant values if said stator frequency is greater than said system voltage frequency limit; and repeating said steps iteratively.

10. The method according to claim 9 wherein said electronic components comprise a microprocessor system.

* * * * *